(12) United States Patent
Suh et al.

(10) Patent No.: US 11,128,246 B2
(45) Date of Patent: Sep. 21, 2021

(54) DRIVING SYSTEM AND METHOD FOR A WOUND ROTOR SYNCHRONOUS GENERATOR

(71) Applicant: INDUSTRIAL COOPERATION FOUNDATION CHONBUK NATIONAL UNIVERSITY, Jeonju-si (KR)

(72) Inventors: Yongsug Suh, Jeonju-si (KR); Thomas Lipo, Madison, WI (US)

(73) Assignee: INDUSTRIAL COOPERATION FOUNDATION CHONBUK NATIONAL UNIVERSITY, Jeonju-si (KR)

( * ) Notice: Subject to any disclaimer, the term of this patent is extended or adjusted under 35 U.S.C. 154(b) by 0 days.

(21) Appl. No.: 16/749,693

(22) Filed: Jan. 22, 2020

(65) Prior Publication Data

US 2021/0203259 A1 Jul. 1, 2021

(30) Foreign Application Priority Data

Jan. 24, 2019 (KR) .................. 10-2019-0008977

(51) Int. Cl.
   *H02P 9/30* (2006.01)
   *F03D 9/25* (2016.01)
   *H02P 103/20* (2016.01)
   *H02P 101/15* (2016.01)

(52) U.S. Cl.
   CPC .............. *H02P 9/305* (2013.01); *F03D 9/255* (2017.02); *F05B 2220/706* (2013.01); *H02P 2101/15* (2015.01); *H02P 2103/20* (2015.01)

(58) Field of Classification Search
   CPC .. H02P 9/305; H02P 2101/15; H02P 2103/20; F03D 9/255; F05B 2220/706
   See application file for complete search history.

(56) References Cited

U.S. PATENT DOCUMENTS

| 3,758,836 | A | * | 9/1973 | Shibata | B60L 15/007 318/732 |
| 4,093,869 | A | * | 6/1978 | Hoffmann | H02K 19/26 290/31 |
| 4,400,659 | A | * | 8/1983 | Barron | H02P 9/42 322/32 |
| 4,503,377 | A | * | 3/1985 | Kitabayashi | H02K 11/048 310/112 |
| 4,517,471 | A | * | 5/1985 | Sachs | H02K 47/18 307/67 |
| 5,418,446 | A | * | 5/1995 | Hallidy | H02K 19/28 322/28 |

(Continued)

*Primary Examiner* — Tulsidas C Patel
*Assistant Examiner* — Joseph Ortega
(74) *Attorney, Agent, or Firm* — McCoy Russell LLP

(57) ABSTRACT

Provided is a driving system and method for a wound rotor synchronous generator. The driving system for a wound rotor synchronous generator according to the present invention includes: a converter controlling the wound rotor synchronous generator and receiving generated power; and a field winding power supply means supplying the power to a field winding of a rotor of the generator. The field winding power supply means is connected to the converter to receive the power from the converter and supply the power to the field winding, the power supplied to the field winding being electrically insulated from the power received from the converter.

10 Claims, 10 Drawing Sheets

(56) References Cited

U.S. PATENT DOCUMENTS

| | | | | |
|---|---|---|---|---|
| 5,587,647 | A  * | 12/1996 | Bansal | F02N 11/04 |
| | | | | 290/31 |
| 6,906,447 | B2 * | 6/2005 | Leijon | H02K 3/28 |
| | | | | 310/196 |
| 9,998,047 | B2 * | 6/2018 | Rozman | H02K 11/33 |
| 2009/0008945 | A1 * | 1/2009 | Helle | F03D 80/00 |
| | | | | 290/55 |
| 2009/0021020 | A1 * | 1/2009 | Andresen | H02P 9/305 |
| | | | | 290/55 |
| 2009/0121482 | A1 * | 5/2009 | Rickard | H02J 3/381 |
| | | | | 290/44 |
| 2012/0327693 | A1 * | 12/2012 | Cousineau | H02J 3/381 |
| | | | | 363/35 |
| 2013/0015658 | A1 * | 1/2013 | Vath | F03D 7/0296 |
| | | | | 290/7 |
| 2013/0313828 | A1 * | 11/2013 | Moreau | H02P 9/14 |
| | | | | 290/44 |
| 2015/0188443 | A1 * | 7/2015 | Takeda | H02J 3/386 |
| | | | | 416/146 R |
| 2015/0333679 | A1 * | 11/2015 | Box | H02P 9/302 |
| | | | | 310/68 D |
| 2016/0094114 | A1 * | 3/2016 | Gao | H02K 3/28 |
| | | | | 310/68 D |
| 2016/0211786 | A1 * | 7/2016 | Rozman | H02K 11/33 |
| 2018/0351491 | A1 * | 12/2018 | Mirafzal | H02M 7/219 |
| 2019/0140571 | A1 * | 5/2019 | Freire | H02P 9/30 |

\* cited by examiner

DRIVING SYSTEM AND METHOD FOR A WOUND ROTOR SYNCHRONOUS GENERATOR

CROSS-REFERENCE TO RELATED APPLICATIONS

The present application claims priority to Korean Patent Application No. 10-2019-0008977 filed on Jan. 24, 2019. The entire contents of the above-listed application is hereby incorporated by reference for all purposes.

TECHNICAL FIELD

The following disclosure relates to a power generation system employing a field wound synchronous generator and a method for controlling the same.

BACKGROUND

The description in this section is merely intended to provide background information of exemplary embodiments set forth herein and should not be understood as describing the related art.

As a wind power generation device increasingly has a larger capacity of several tens or more megawatts, a generator, which is a core electrical component of the wind power generation device, also increasingly has a larger rated capacity. Various technologies such as permanent magnet synchronous generators and synchronous generators using superconductors are being currently considered in designing wind power generation devices at a level of several tens of megawatts, but do not economically satisfy the various requirements for the wind power generation device such as reliability, weight, efficiency, volume, and maintenance. The present invention has an object to make it possible to efficiently utilize a conventional wound rotor synchronous generator having a large capacity at a level of several tens of megawatts, which is used in a gas turbine power generation device, for application to a wind power generation device.

The wound rotor synchronous generator has a field winding on a rotating rotor thereof, and power should be supplied from the outside to the field winding. FIG. 1 is a schematic configuration diagram of a conventional wound rotor synchronous generator system. As illustrated in FIG. 1, the conventional wound rotor synchronous generator system includes a slip ring 122 and a brush 121, and the power is supplied from the outside to the field winding through the slip ring 122 and the brush 121 using an automatic voltage regulator (AVR). This approach is simple, but the brush becomes worn out. Thus, it is difficult to maintain the power generation system, because it is necessary to stop the power generation system and replace the brush on a regular basis.

SUMMARY

An embodiment of the present invention is directed to providing a driving system and method for a wound rotor synchronous generator making it possible to efficiently utilize a conventional wound rotor synchronous generator having a large capacity at a level of several tens of megawatts, which is used in a gas turbine power generation device, for application to a wind power generation device. According to the present invention, it is possible to simplify a complicated method for supplying power to a field winding, which is recognized as a disadvantage in applying the conventional large-capacity wound rotor synchronous generator to a wind power generation device, by using an inverter and a rotary transformer. In addition, the present invention does not require a brush/slip ring structure, which is a big obstacle in maintaining the wound rotor synchronous generator, thereby improving the maintenance of an offshore wind power generation device.

In one general aspect, a driving system for a wound rotor synchronous generator includes: a converter controlling the wound rotor synchronous generator and receiving generated power; and a field winding power supply means supplying the power to a field winding of a rotor of the generator, wherein the field winding power supply means is connected to the converter to receive the power from the converter and supply the power to the field winding, the power supplied to the field winding being electrically insulated from the power received from the converter.

The converter may include at least three switch legs each outputting a voltage at a plurality of levels and including a plurality of semiconductor switches and a plurality of diodes, and a capacitor module including at least one capacitor.

At least a portion of the field winding power supply means may rotate with the rotor of the generator to supply the power.

The field winding power supply means may include a rectification unit rotating with the rotor of the generator and supplying a direct current to the field winding of the generator.

The field winding power supply means may include a rotary transformer including a stator and a rotor, the rotor of the rotary transformer may be mechanically coupled to a shaft of the generator, the rotor of the rotary transformer may include a secondary winding, and the secondary winding may be connected to the rectification unit.

The stator of the rotary transformer may include a primary winding connected to the rectification unit.

The converter may include at least four switch legs.

An output terminal N4 of a fourth switch leg may be connected to one end (a) of the primary winding.

The other end (b) of the primary winding may be connected to a neutral point of a stator winding of the generator.

The capacitor module may include a first capacitor and a second capacitor that are connected to each other in series.

The other end (b) of the primary winding may be connected to a node G to which the first capacitor and the second capacitor are connected.

A filter unit may be further included between the generator and the converter, the filter unit having a neutral point in a Y-type connection.

The other end (b) of the primary winding may be connected to the neutral point of the filter unit.

A distance between the generator and the filter unit may be shorter than that between the generator and the converter.

At least one of the switch legs may output a voltage at three levels.

The switch leg may include a first semiconductor switch and a second semiconductor switch that are connected to each other in series between a positive terminal of the capacitor module and an output terminal of the switch leg; a first diode whose cathode is connected to a node to which the first semiconductor switch and the second semiconductor switch are connected and anode is connected to the node to which the first capacitor and the second capacitor are connected; a third semiconductor switch and a fourth semiconductor switch that are connected to each other in series between a negative terminal of the capacitor module and the output terminal of the switch leg; and a second diode whose anode is connected to a node to which the third semiconductor switch and the fourth semiconductor switch are connected and whose cathode is connected to the node to which the first capacitor and the second capacitor are connected.

The converter may further include a snubber module restricting a current slope, and an overvoltage protection circuit module preventing generation of an overvoltage in the capacitor module, and the snubber module and the overvoltage protection circuit module may be connected in parallel with the capacitor module.

In another general aspect, a wind power generation system includes: a wind blade for wind power generation; a wound rotor synchronous generator connected to the wind blade and having a field winding on a rotor thereof; and the driving system for a wound rotor synchronous generator as described above.

An inverter connected between the converter and a power supply grid may be further included to transfer the power received by the converter from the generator to the power supply grid.

In another general aspect, a method for controlling a converter in a driving system for a wound rotor synchronous generator including a wound rotor synchronous generator, a field winding power supply means supplying power to a field winding of the generator using a rotary transformer, and the converter connected to a primary winding provided on a stator of the rotary transformer includes: by a control means of the converter, (a) setting a command value of a field current, which is a current flowing in the field winding of the generator, to a predetermined value; (b) measuring the field current $I_f$; (c) calculating a first voltage command to be applied to the rotary transformer based on a control error that is a difference between the command value $I_f^*$ of the field current and the measured value of the field current; (d) generating a corrected second voltage command by correcting the first voltage command; (e) generating a pulse width modulation (PWM) control signal of a switch of a switch leg connected to the field winding power supply means based on the second voltage command; and (f) controlling the switch based on the PWM control signal.

Step (d) may include: (d-1) generating a second voltage command signal by restricting the first voltage command to be between a predetermined maximum value and a predetermined minimum value; (d-2) calculating a difference between the first voltage command and the second voltage command; and (d-3) calculating a correction amount by multiplying the difference by a predetermined gain.

Step (c) may include: (c-1) calculating a 1-1-st voltage command by multiplying the control error by the predetermined gain Kp; (c-2) calculating a 1-2-nd voltage command by adding the control error and the correction amount together and integrating the result over time; and (c-3) generating the first voltage command by adding the 1-1-st voltage command and the 1-2-nd voltage command together.

Step (e) may include: (e-1) calculating a third voltage command by multiplying the second voltage command by −1; (e-2) generating a first PWM control signal based on the second voltage command and generating a second PWM control signal based on the third corrected voltage command; and (e-3) generating the PWM control signal of the switch by adding the first PWM control signal and the second PWM control signal together.

In another general aspect, there is provided a computer-readable recording medium storing a program for performing the method for controlling a converter in a driving system for a wound rotor synchronous generator as described above.

Hereinafter, the present invention will be described in more detail through exemplary examples. However, the exemplary examples are only for illustrative purposes and are not intended to limit the present invention.

DETAILED DESCRIPTION OF MAIN ELEMENTS

Figure 1:
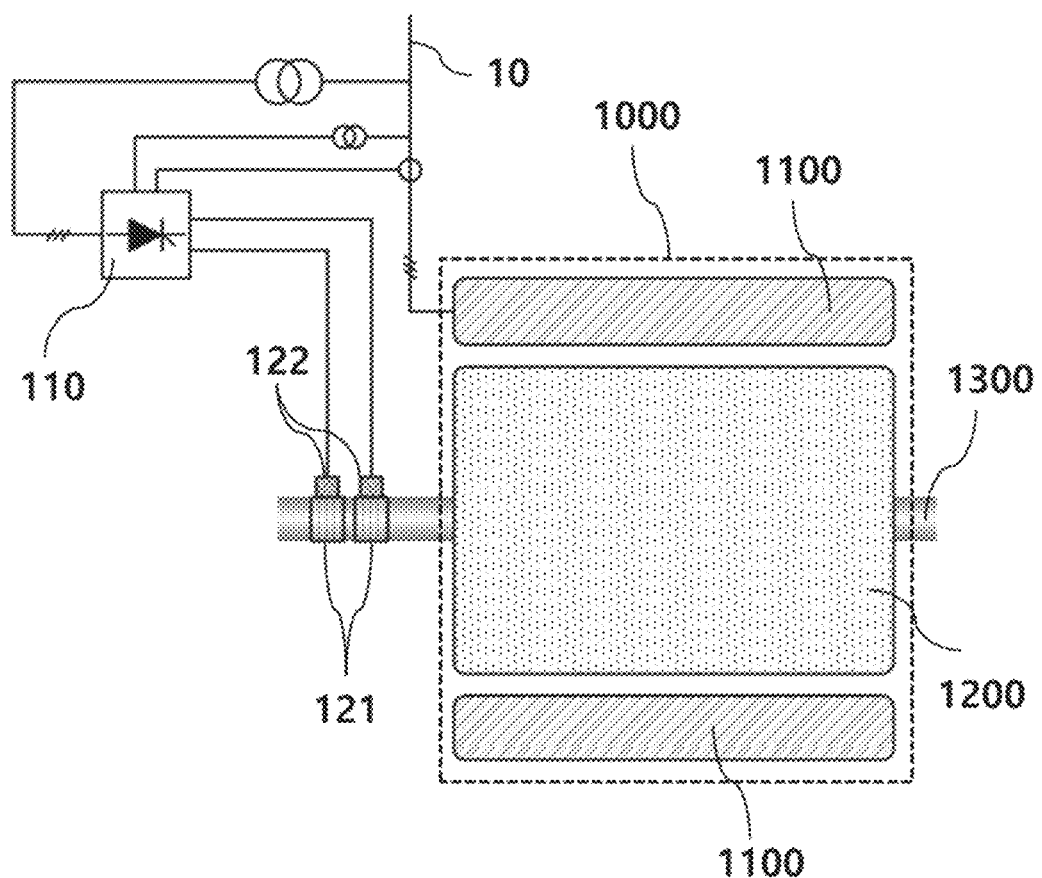
FIG. 1 illustrates an example of a conventional driving system for a wound rotor synchronous generator.

10: Three-phase power supply
110: Automatic voltage regulator (AVR)
121: Brush
122: Slip ring
1000: Wound rotor synchronous generator
1100: Stator of generator
1200: Rotor of generator
1210: Field winding of rotor of generator
1300: Rotating shaft of generator
2000: Field winding power supply means
2100: Rotary transformer
2110: Stator of rotary transformer
2111: Primary winding (Stator winding of rotary transformer)
2120: Rotor of rotary transformer
2121: Secondary winding (Rotor winding of rotary transformer)
2200: Rectification unit
3000: Converter
3100: First switch leg
3200: Second switch leg
3300: Third switch leg
3400: Fourth switch leg
3500: Capacitor module
3600: Snubber
4000: Filter unit

DETAILED DESCRIPTION

The above-described objects, features, and advantages of the present invention will be more apparent from the following exemplary embodiments, which will be described with reference to the accompanying drawings. The specific structural and functional descriptions disclosed herein are merely exemplary for the purpose of describing the exemplary embodiments according to the concept of the present invention. The exemplary embodiments according to the concept of the present invention may be implemented in various forms and should not be construed as being limited to the exemplary embodiments set forth in the present specification or application. While the exemplary embodiments according to the concept of the present invention may be modified variously and may have various forms, the specific exemplary embodiments will be illustrated in the drawings and described in detail in the present specification or application. However, it should be understood that the exemplary embodiments according to the concept of the present invention are not limited to the particular forms disclosed herein, but are intended to cover all modifications, equivalents, and alternatives falling within the spirit and technical scope of the present invention. The terms "first", "second", and/or the like may be used herein to describe various elements, but the elements are not limited by the terms. The terms are merely used to distinguish one element from another element. For example, a first element may be referred to as a second element without departing from the scope according to the concept of the present invention, and similarly, the second element may also be referred to as the first element. When a certain element is described as being connected or coupled to another element, although the certain element may be directly connected or coupled to the other element, it should be understood that another intervening element may exist therebetween. On the other hand, when a certain element is described as being directly connected or directly coupled to another element, it should be understood that no intervening element exists therebetween. Other expressions for describing a relationship between elements, i.e. "between", "directly between", "adjacent to", "directly adjacent to", and the like, should also be construed in the same manner. Terms used in the present specification are used only for describing specific exemplary embodiments, and are not intended to limit the present invention. Singular forms include plural forms unless the context clearly indicates otherwise. It should be further understood that the terms "include" or "have" as used in the present specification specifies the presence of features, numerals, steps, operations, elements, parts, or combinations thereof mentioned previously in the specification, but does not preclude the presence or addition of one or more other features, numerals, steps, operations, elements, parts, or combinations thereof. Unless defined otherwise, all terms used herein, including technical or scientific terms, have the same meaning as commonly understood by those having ordinary skill in the art to which the present invention pertains. Terms such as those defined in generally used dictionaries should be interpreted to have meanings consistent with the contextual meanings in the relevant art, and are not to be interpreted to have ideal or excessively formal meanings unless clearly defined in the present specification. Hereinafter, the present invention will be described in detail by describing preferred exemplary embodiments of the present invention with reference to the accompanying drawings. Identical reference marks shown in each drawing are used to denote identical elements.

Figure 2:
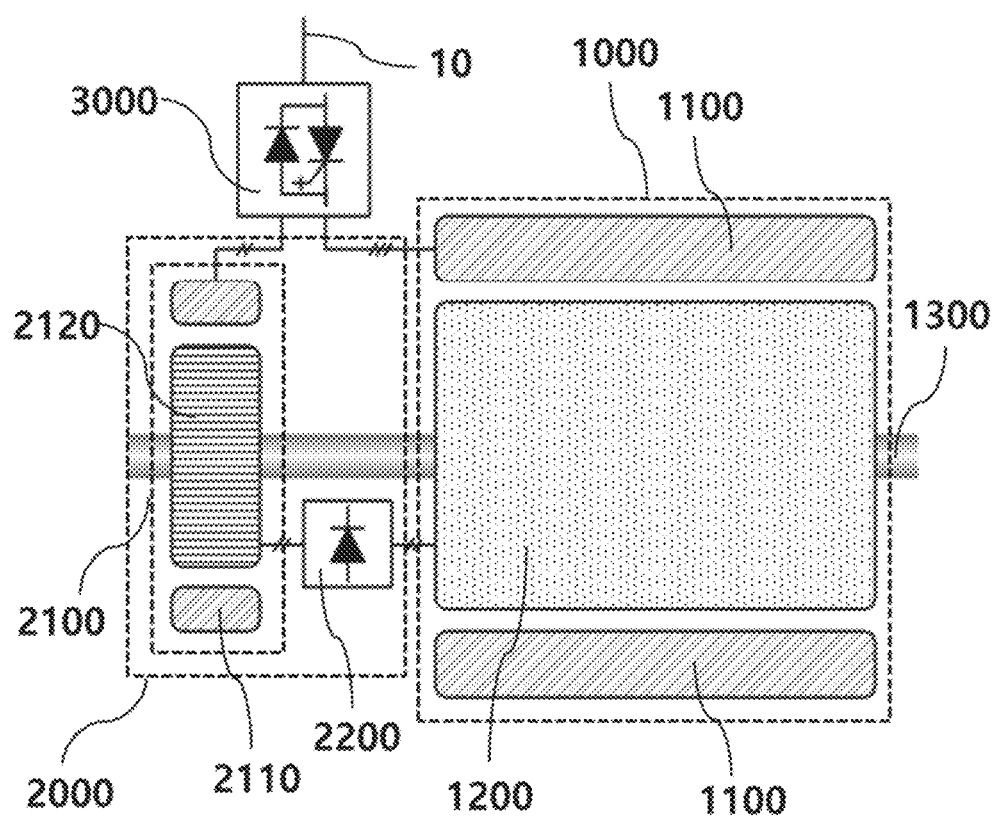
FIG. 2 illustrates a schematic configuration diagram of a driving system for a wound rotor synchronous generator proposed by the present invention.

As illustrated in FIG. 2, a driving system for a wound rotor synchronous generator according to the present invention includes: a converter 3000 controlling the wound rotor synchronous generator 1000 and receiving generated power; and a field winding power supply means 2000 supplying the power to a field winding 1210 of a rotor 1200 of the generator. The field winding power supply means 2000 is connected to the converter 3000 to receive the power from the converter 3000 and supply the power to the field winding 1210, the power supplied to the field winding being electrically insulated from the power received from the converter 3000.

Figure 3A:
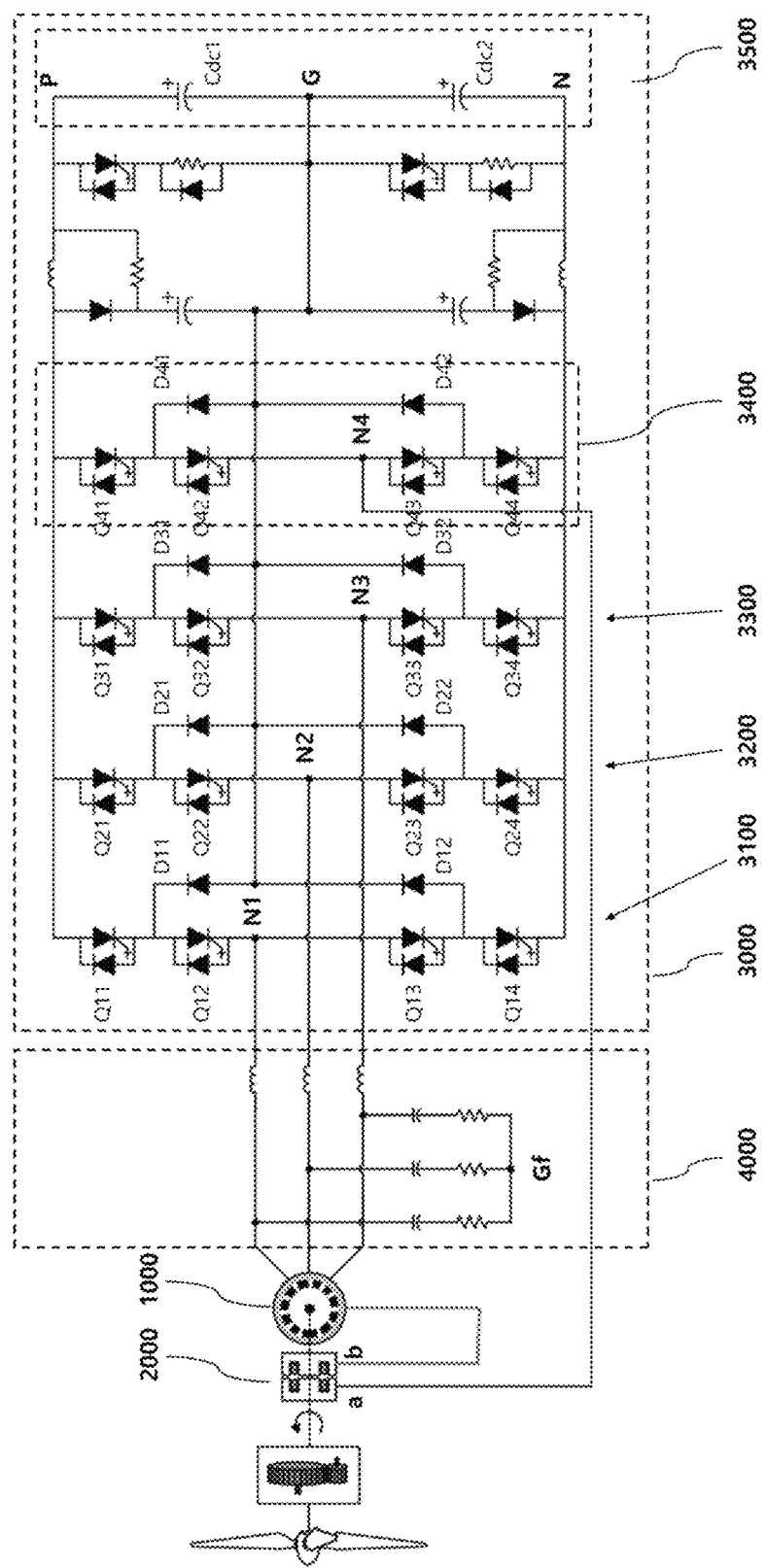
FIGS. 3A and 3B illustrate a first exemplary embodiment of a driving system for a wound rotor synchronous generator proposed by the present invention.

As illustrated in FIG. 3A, the converter 3000 includes at least three switch legs each outputting a voltage at a plurality of levels and including a plurality of semiconductor switches, and a capacitor module 3500 including at least one capacitor.

Here, as illustrated in FIG. 3A, a first switch leg, which includes semiconductor switches Q11, Q12, Q13 and Q14 and diodes D11 and D12, may be implemented in a three-level form. Although not shown in the drawings, the first switch leg may be implemented in a two-level form while including two semiconductor switch elements. Furthermore, the first switch leg may be implemented to have a plurality of multi-level structures, each being composed of two levels.

As illustrated in FIG. 2, at least a portion of the field winding power supply means 2000 may rotate with the rotor 1200 of the generator to supply the power.

The field winding power supply means 2000 may include a rectification unit 2200 rotating with the rotor 1200 of the generator and supplying a direct current to the field winding 1210 of the rotor of the generator.

Based on this feature, it is possible to avoid a conventional method using a slip ring and a brush, which require continuous maintenance, and employ a method in which power is supplied to the field winding through a rotary transformer and the rectification unit rotating with a rotor of the transformer, thereby providing a power generation system that is simple maintenance-enabled, semi-permanent, and highly reliable.

The field winding power supply means 2000 may include the rotary transformer 2100 including a stator 2110 and a rotor 2120, the rotor of the rotary transformer may be mechanically coupled to a rotating shaft 1300 of the generator, the rotor of the rotary transformer may include a secondary winding 2121, and the secondary winding 2121 may be connected to the rectification unit 2200.

The stator 2110 of the rotary transformer 2100 may include a primary winding 2111 connected to the rectification unit 2200.

Figure 3B:
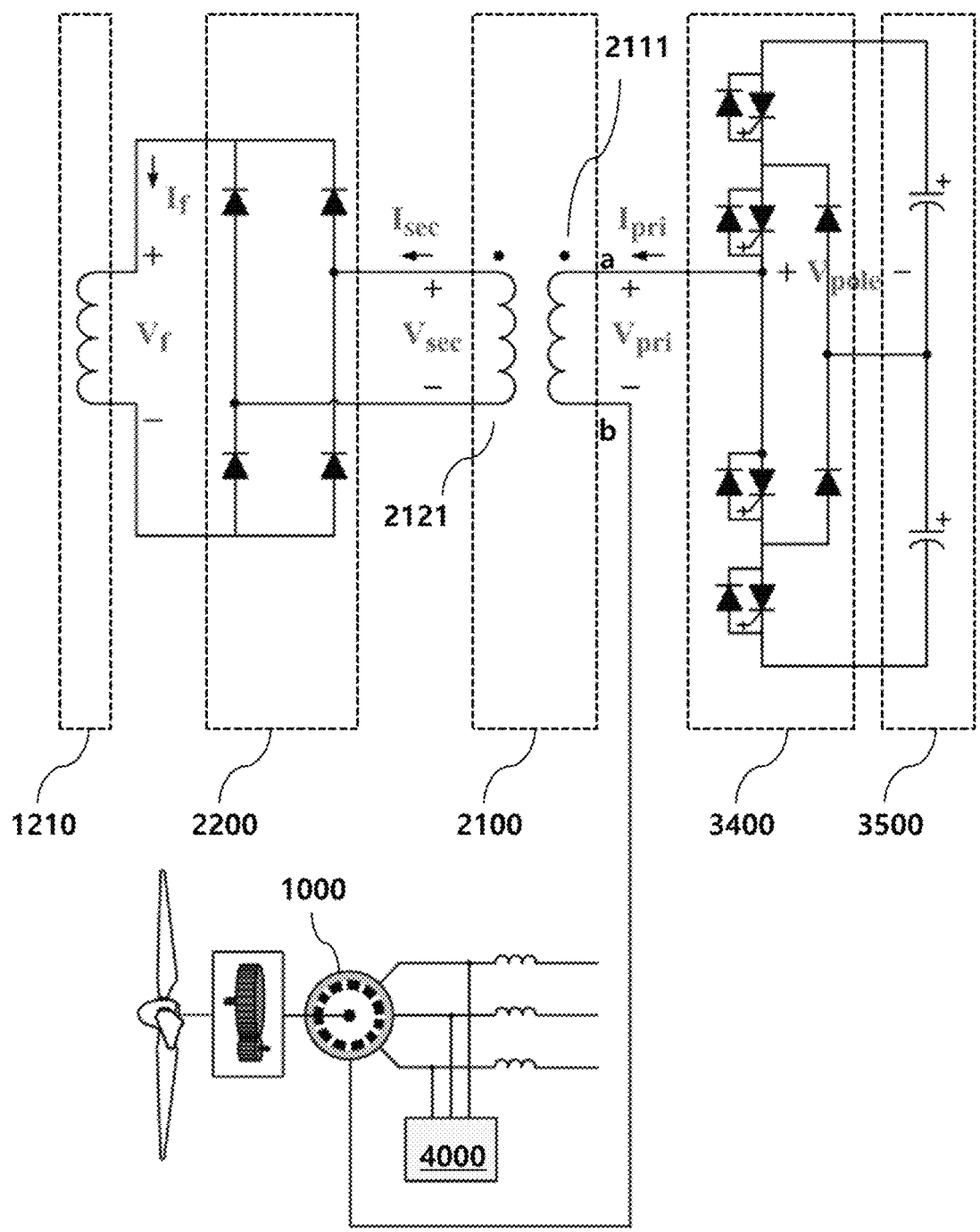

As illustrated in FIGS. 3A and 3B, the converter 3000 may include at least four switch legs.

An output terminal N4 of a fourth switch leg 3400 may be connected to one end (a) of the primary winding 2111.

Based on this feature, it is possible to make the system simple, inexpensive, and easy to maintain by merely adding one switch leg to the converter, which is used to receive power from the generator, so that the added switch leg is used to supply the power to the primary winding of the field winding power supply means, without requiring a separate power supplier or a separate controller for supplying the power to the field winding power supply means.

In order to conduct a current to the primary winding 2111, the other end (b) of the primary winding 2111 should be electrically connected to form a closed loop. The system may be greatly affected by noise depending on the closed loop formed at this time, and the system may be stopped or improperly operated due to the noise. In particular, the noise has a greater influence on high-voltage and large-power applications, and the problem resulting therefrom is more severe.

First Exemplary Embodiment

As illustrated in FIGS. 3A and 3B, the other end (b) of the primary winding 2111 may be connected to a neutral point of a stator winding of the generator 1000.

Based on this feature, it is possible to reduce harmonics caused in a DC link of an inverter, harmonics caused in the generator, and common-mode noise.

Second Exemplary Embodiment

Figure 4A:
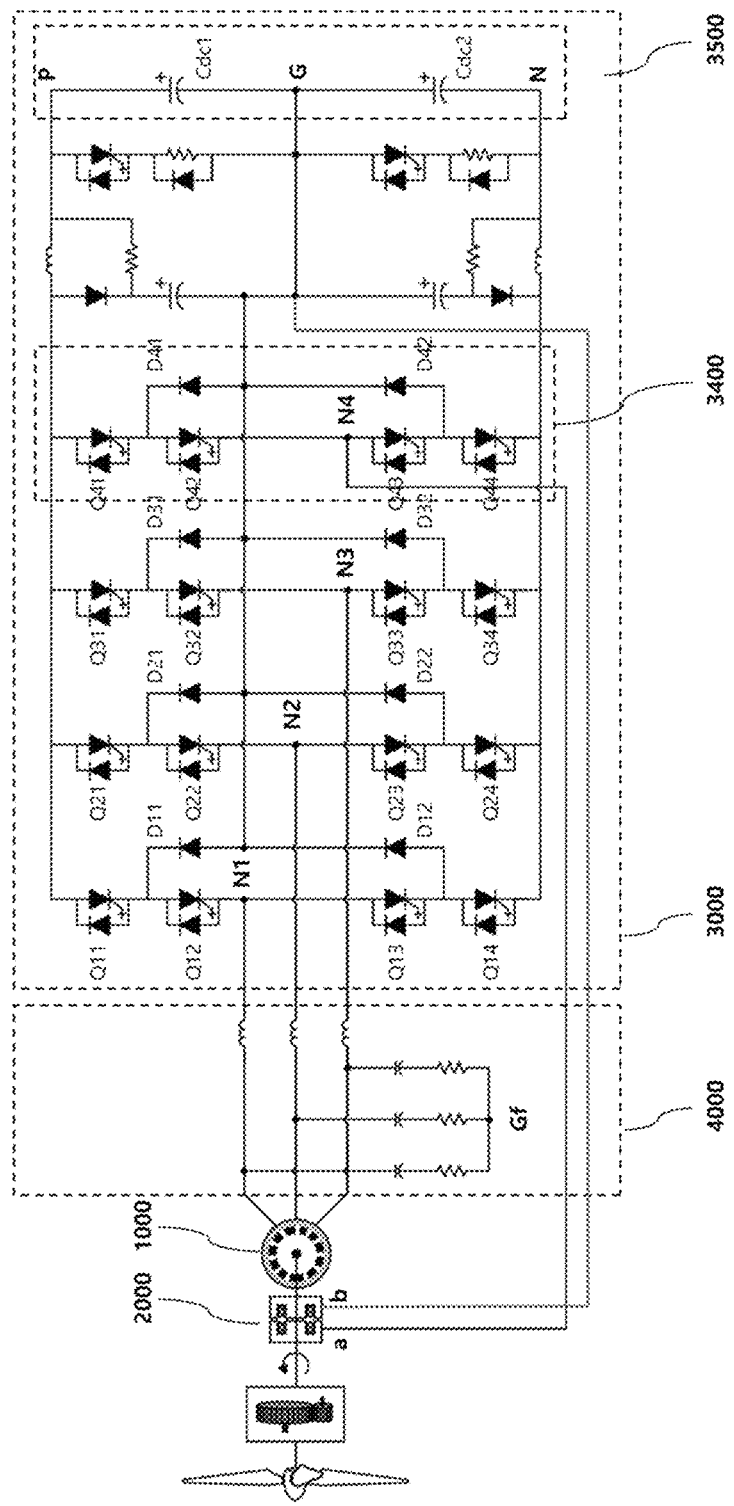
FIGS. 4A and 4B illustrate a second exemplary embodiment of a driving system for a wound rotor synchronous generator proposed by the present invention.
Figure 4B:
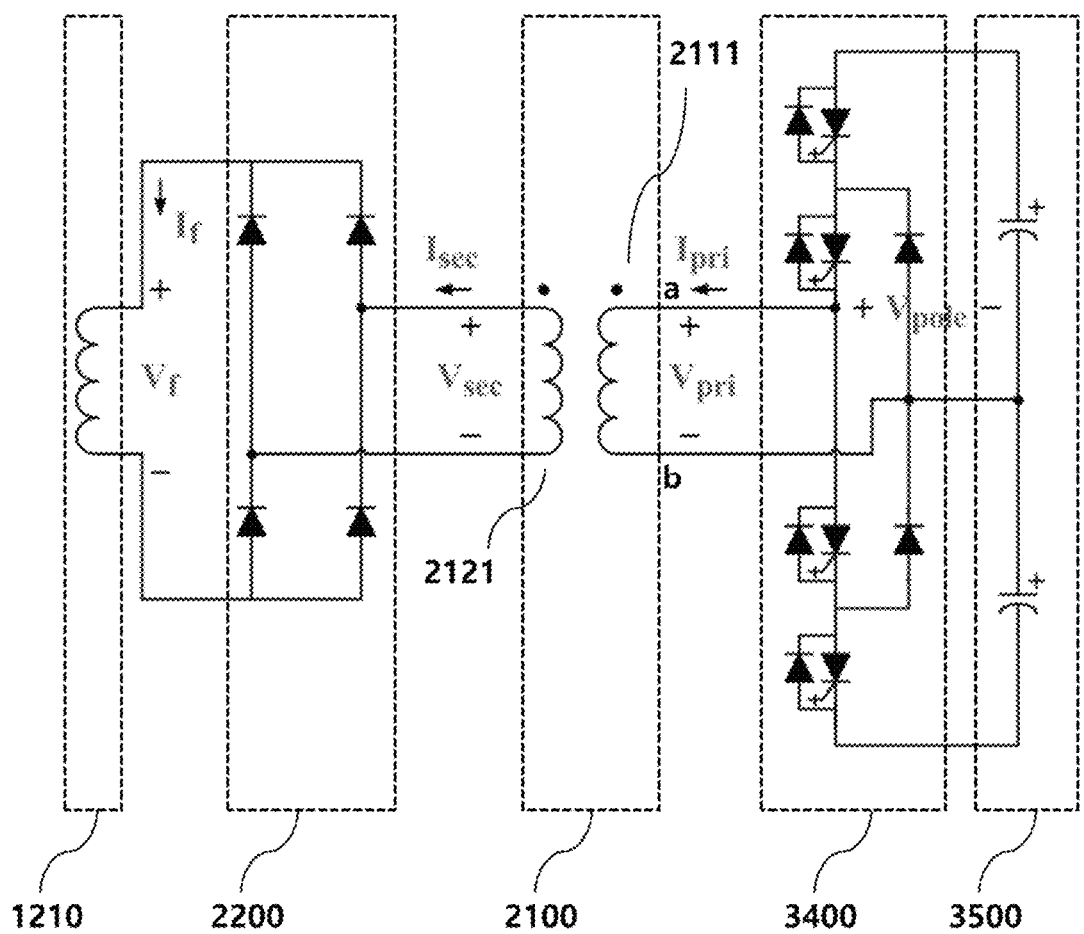

As illustrated in FIGS. 4A and 4B, the capacitor module 3500 may include a first capacitor Cdc1 and a second capacitor Cdc2 that are connected to each other in series.

The other end (b) of the primary winding 2111 may be connected to a node G (corresponding to a neutral point of the converter) to which the first capacitor and the second capacitor are connected.

Based on this feature, it is possible to reduce harmonics caused in the DC link of the inverter, harmonics caused in the generator, and common-mode noise. In particular, in the case where it is difficult to connect the neutral point of the stator winding of the generator with the outside of the generator, installation is facilitated by simply connecting the other end (b) of the primary winding 2111 to the neutral point G of the converter.

Third Exemplary Embodiment

Figure 5A:
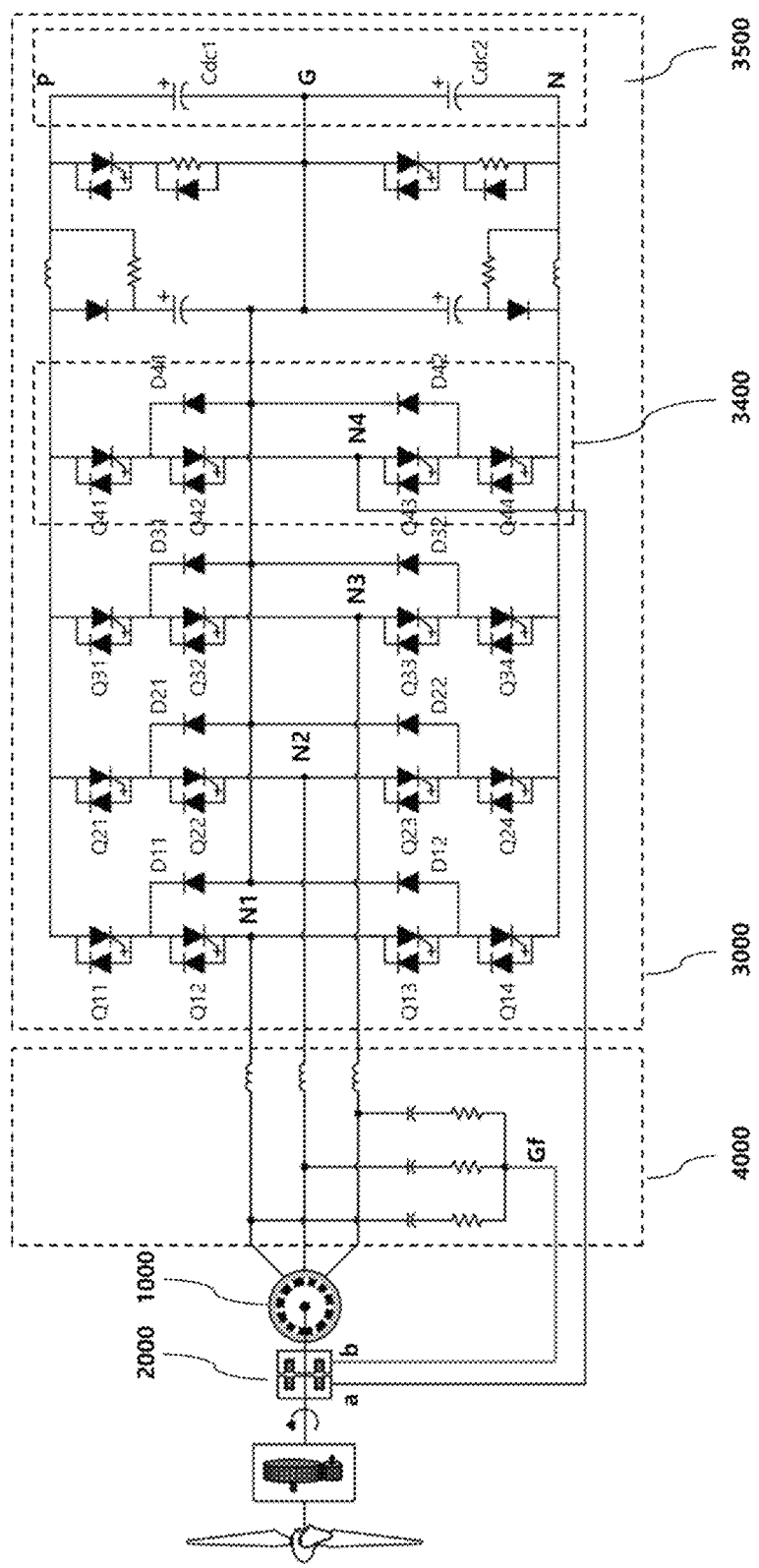
FIGS. 5A and 5B illustrate a third exemplary embodiment of a driving system for a wound rotor synchronous generator proposed by the present invention.
Figure 5B:
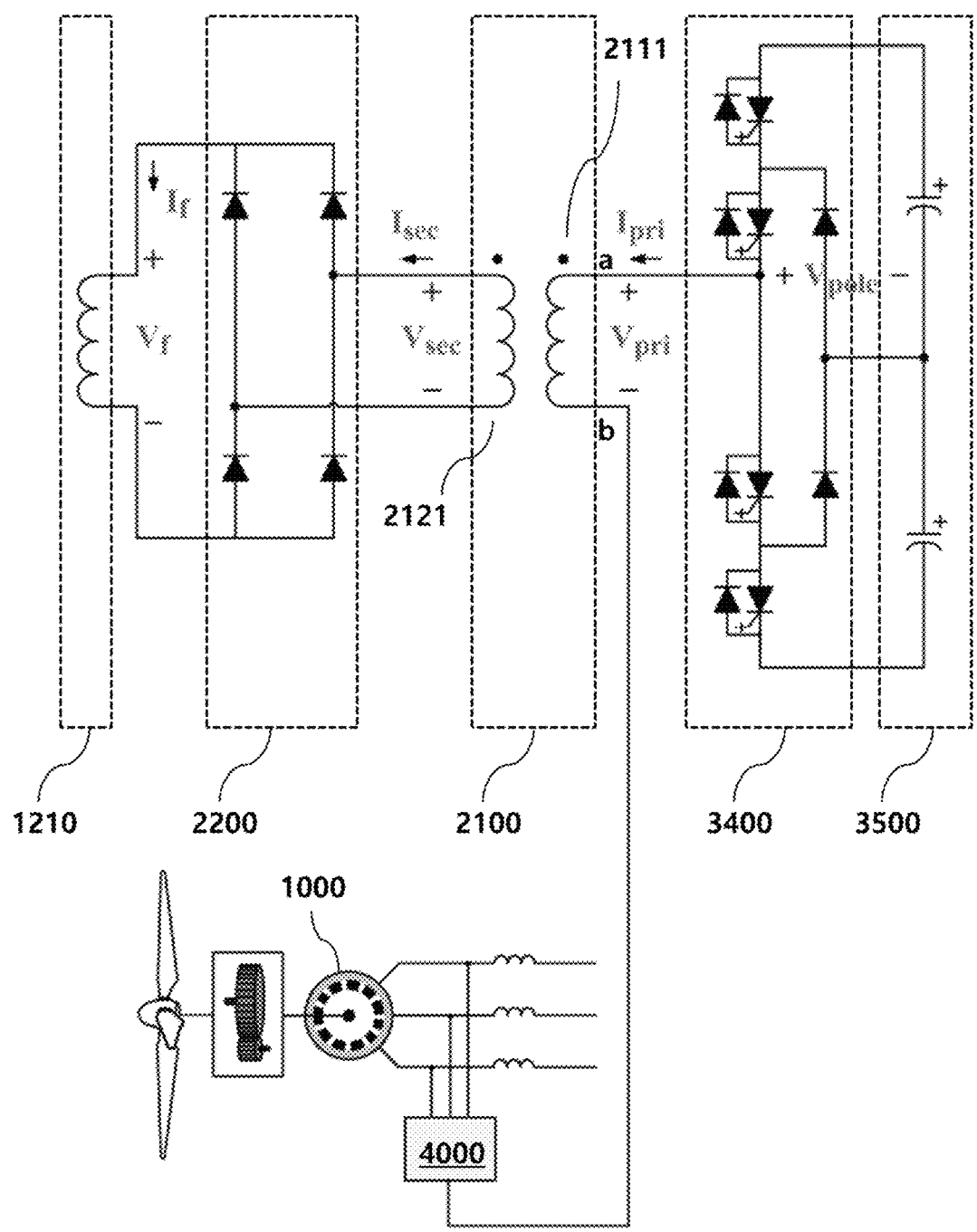

As illustrated in FIGS. 5A and 5B, a filter unit may be further included between the generator and the converter 3000, the filter unit having a neutral point Gf in a Y-type connection.

The other end (b) of the primary winding 2111 may be connected to the neutral point Gf of the filter unit.

A distance between the generator and the filter unit may be shorter than that between the generator and the converter.

Based on this feature, it is possible to reduce harmonics caused in the DC link of the inverter, harmonics caused in the generator, and common-mode noise. In particular, given that the filter unit may be installed close to the generator, the converter may be installed in a separate space away from the generator in consideration of the ambient temperature, vibration, etc., and it is difficult to connect the neutral point of the stator winding of the generator with the outside of the generator in many cases, installation is facilitated by connecting the other end (b) of the primary winding 2111 to the neutral point of the filter unit which is easy to install around the generator. In addition, it is possible to reduce a length of a cable connected to the other end (b) of the primary winding 2111.

As illustrated in FIGS. 3A, 4A and 5A, at least one of the switch legs may output a voltage at three levels.

Based on this feature, it is possible to lower a voltage slope and a current slope in a high-voltage and large-capacity system, thereby suppressing generation of noise.

The switch leg may include: a first semiconductor switch Q11, Q21, Q31 or Q41 and a second semiconductor switch Q12, Q22, Q32 or Q42 that are connected to each other in series between a positive terminal of the capacitor module 3500 and an output terminal of the switch leg; a first diode D11, D21, D31 or D41 whose cathode is connected to a node to which the first semiconductor switch and the second semiconductor switch are connected and anode is connected to the node G to which the first capacitor and the second capacitor are connected; a third semiconductor switch Q13, Q23, Q33 or Q43 and a fourth semiconductor switch Q14, Q24, Q34 or Q44 that are connected to each other in series between a negative terminal of the capacitor module 3500 and the output terminal of the switch leg; and a second diode D12, D22, D32 or D42 whose anode is connected to a node to which the third semiconductor switch and the fourth semiconductor switch are connected and cathode is connected to the node to which the first capacitor and the second capacitor are connected.

The converter 3000 may further include a snubber module restricting a current slope, and an overvoltage protection circuit module preventing generation of an overvoltage in the capacitor module 3500. The snubber module and the overvoltage protection circuit module may be connected in parallel with the capacitor module 3500.

Based on this feature, it is possible to lower a current slope, thereby suppressing generation of noise.

According to the present invention, a wind power generation system includes: a wind blade for wind power generation; a wound rotor synchronous generator 1000 connected to the wind blade and having a field winding on a rotor thereof; and the driving system for a wound rotor synchronous generator 1000 as described above.

An inverter connected between the converter 3000 and a power supply grid may be further included to transfer the power received by the converter 3000 from the generator 1000 to the power supply grid.

Figure 6A:
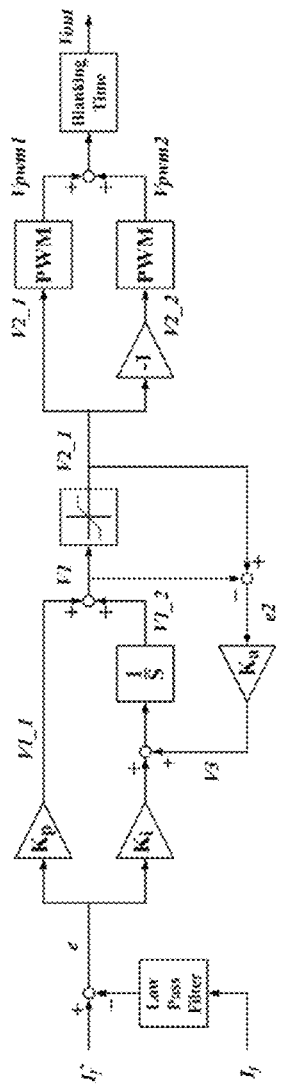
FIGS. 6A and 6B are control block diagrams schematically illustrating a method for controlling a converter in a driving system for a wound rotor synchronous generator proposed by the present invention.
Figure 6B:
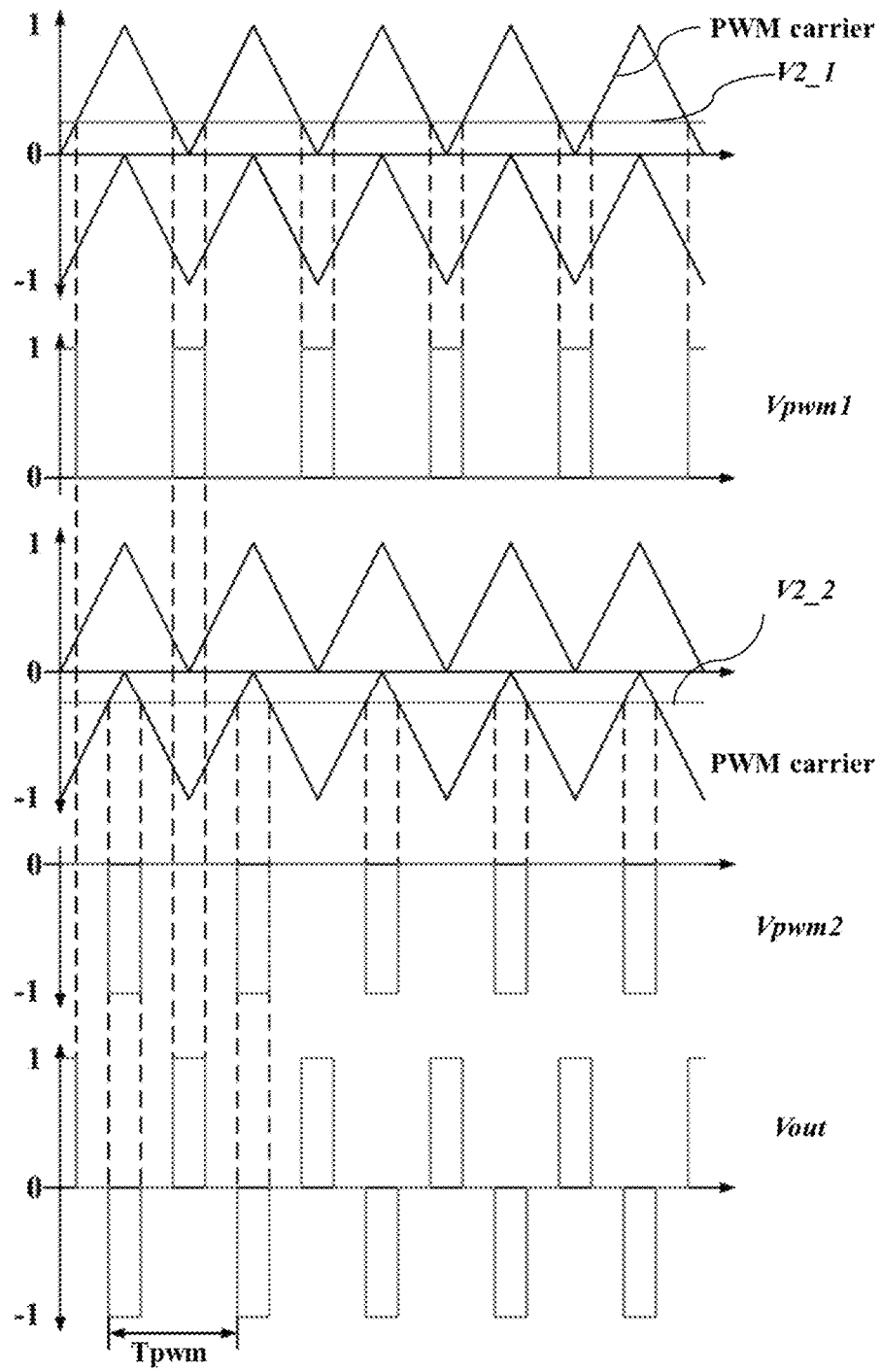

As illustrated in FIGS. 6A and 6B, according to the present invention, a method for controlling a converter 3000, in a driving system for a wound rotor synchronous generator including a wound rotor synchronous generator 1000, a field winding power supply means 2000 supplying power to a field winding of the generator using a rotary transformer 2100, and the converter 3000 connected to a primary winding 2111 provided on a stator of the rotary transformer 2100, includes: by a control means of the converter 3000, (a) setting a command value of a field current, which is a current flowing in the field winding of the generator, to a predetermined value; (b) measuring the field current; (c) calculating a first voltage command to be applied to the rotary transformer 2100 based on a control error that is a difference between the command value of the field current and the measured value of the field current; (d) generating a corrected second voltage command by correcting the first voltage command; (e) generating a pulse width modulation (PWM) control signal of a switch of a switch leg connected to the field winding power supply means 2000 based on the second voltage command; and (f) controlling the switch based on the PWM control signal.

Step (d) may include: (d-1) generating a second voltage command signal by restricting the first voltage command to be between a predetermined maximum value and a predetermined minimum value; (d-2) calculating a difference between the first voltage command and the second voltage command; and (d-3) calculating a correction amount by multiplying the difference by a predetermined gain.

Step (c) may include: (c-1) calculating a 1-1-st voltage command by multiplying the control error by the predetermined gain Kp; (c-2) calculating a 1-2-nd voltage command by adding the control error and the correction amount together and integrating the result over time; and (c-3) generating the first voltage command by adding the 1-1-st voltage command and the 1-2-nd voltage command together.

Step (e) may include: (e-1) calculating a third voltage command by multiplying the second voltage command by −1; (e-2) generating a first PWM control signal based on the second voltage command and generating a second PWM control signal based on the third corrected voltage command; and (e-3) generating the PWM control signal of the switch by adding the first PWM control signal and the second PWM control signal together.

As described above, the present invention has the following effects:

(1) it is possible to construct a wind power generation system using the large-capacity wound rotor synchronous generator;

(2) the field winding power supply means supplying the power to the field winding of the rotor of the large-capacity wound rotor synchronous generator makes it possible to avoid a conventional method using a slip ring and a brush, which require continuous maintenance, and employ a method in which the power is supplied to the field winding through the rotary transformer and the rectification unit rotating with the rotor of the transformer, thereby providing a power generation system that is simple maintenance-enabled, semi-permanent, and highly reliable; and (3) in particular, in a case of a wind power generation system such as an offshore wind power generation system provided at a location that is very difficult for a worker to approach, it is possible to greatly save the cost and the time for maintenance.

The invention claimed is:

1. A driving system for a wound rotor synchronous generator, comprising:
   a converter controlling the wound rotor synchronous generator and receiving generated power; and
   a field winding power supply means supplying power to a field winding of a rotor of the generator,
   wherein the field winding power supply means is connected to the converter to receive the power from the converter and supply the power to the field winding, the power supplied to the field winding being electrically insulated from the power received from the converter, and
   wherein the converter includes:
      at least three switch legs each outputting a voltage at a plurality of levels and including a plurality of semiconductor switches,
      a plurality of diodes, and
      a capacitor module including at least one capacitor.

2. The driving system for the wound rotor synchronous generator of claim 1, wherein at least a portion of the field winding power supply means rotates with the rotor of the generator to supply the power.

3. The driving system for the wound rotor synchronous generator of claim 2, wherein the field winding power supply means includes a rectification unit rotating with the rotor of the generator and supplying a direct current to the field winding of the generator.

4. The driving system for the wound rotor synchronous generator of claim 3, wherein the field winding power supply means includes a rotary transformer including a stator and a rotor,
   wherein the rotor of the rotary transformer is mechanically coupled to a shaft of the generator,
   the rotor of the rotary transformer includes a secondary winding, and
   the secondary winding is connected to the rectification unit.

5. The driving system for the wound rotor synchronous generator of claim 4, wherein the stator of the rotary transformer includes a primary winding connected to the rectification unit.

6. The driving system for the wound rotor synchronous generator of claim 5, wherein the converter includes at least four switch legs.

7. The driving system for the wound rotor synchronous generator of claim 6, wherein an output terminal of a fourth switch leg is connected to one end of the primary winding.

8. A wind power generation system, comprising:
   a wind blade for wind power generation;
   a wound rotor synchronous generator connected to the wind blade and having a field winding on a rotor thereof;
   the driving system for a wound rotor synchronous generator of claim 1; and
   an inverter connected between the converter and a power supply grid to transfer the power received by the converter from the generator to the power supply grid.

9. A method for controlling a converter, in a driving system for a wound rotor synchronous generator including a wound rotor synchronous generator, a field winding power supply means supplying power to a field winding of the generator using a rotary transformer, and the converter connected to a primary winding provided on a stator of the rotary transformer, the method comprising:
   by a control means of the converter,
   (a) setting a command value of a field current, which is a current flowing in the field winding of the generator, to a predetermined value;
   (b) measuring the field current;
   (c) calculating a first voltage command to be applied to the rotary transformer based on a control error that is a difference between the command value of the field current and the measured value of the field current;
   (d) generating a corrected second voltage command by correcting the first voltage command;
   (e) generating a pulse width modulation (PWM) control signal of a switch of a switch leg connected to the field winding power supply means based on the second voltage command; and
   (f) controlling the switch based on the PWM control signal.

10. The method of claim 9, wherein step (d) includes:
   (d-1) generating a second voltage command signal by restricting the first voltage command to be between a predetermined maximum value and a predetermined minimum value;
   (d-2) calculating a difference between the first voltage command and the second voltage command; and
   (d-3) calculating a correction amount by multiplying the difference by a predetermined gain.

* * * * *